United States Patent
Kim et al.

(10) Patent No.: US 9,575,355 B2
(45) Date of Patent: Feb. 21, 2017

(54) MODULE FOR A LIQUID CRYSTAL DISPLAY COMPRISING A FIRST POLARIZER AND A SECOND POLARIZER HAVING FIRST AND SECOND MACHINE DIRECTIONS AND LIQUID CRYSTAL DISPLAY INCLUDING THE SAME

(71) Applicant: SAMSUNG SDI CO., LTD., Yongin-si, Gyeonggi-do (KR)

(72) Inventors: Do Won Kim, Uiwang-si (KR); Hae Ryong Chung, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 14/561,179

(22) Filed: Dec. 4, 2014

(65) Prior Publication Data
US 2015/0168779 A1    Jun. 18, 2015

(30) Foreign Application Priority Data
Dec. 27, 2013    (KR) .......................... 10-2013-0164923

(51) Int. Cl.
   G02F 1/1335    (2006.01)
(52) U.S. Cl.
   CPC .............................. G02F 1/133528 (2013.01)
(58) Field of Classification Search
   CPC ...... G02F 1/0311; G02F 1/116; G02F 1/1335; G02F 1/133536; G02F 1/13362; G03F 9/7065; H01L 51/5293; H04B 10/532
   See application file for complete search history.

(56) References Cited

U.S. PATENT DOCUMENTS

| 2011/0013115 A1* | 1/2011 | Kajita | G02F 1/133528 349/61 |
| 2015/0022764 A1 | 1/2015 | Takeda et al. | |
| 2015/0027626 A1 | 1/2015 | Hada et al. | |
| 2015/0131038 A1 | 5/2015 | Ishiguro et al. | |

FOREIGN PATENT DOCUMENTS

| JP | 2011- 022510 A | 2/2011 |
| KR | 10-2005-0038107 | 4/2005 |
| KR | 10-2010-0007133 | 1/2010 |
| KR | 10-2012-0119111 | 10/2012 |
| TW | 201344287 A | 11/2013 |

(Continued)

OTHER PUBLICATIONS

Korean Office action dated Jun. 29, 2016, corresponding to Korean Patent Application No. 10-2013- 0164923 (4 pages).

(Continued)

*Primary Examiner* — Paul Lee
(74) *Attorney, Agent, or Firm* — Lewis Roca Rothgerber Christie LLP

(57) ABSTRACT

The module for a liquid crystal display includes a liquid crystal display panel, a first polarizer formed on an upper side of the liquid crystal display panel, and a second polarizer formed on a lower side of the liquid crystal display panel, wherein the first polarizer has a length in a machine direction, the second polarizer has a width in the machine direction, a shrinkage force of the second polarizer is greater than a shrinkage force of the first polarizer, and the length of a polarizer is greater than the width of a polarizer.

9 Claims, 4 Drawing Sheets

(56) References Cited

FOREIGN PATENT DOCUMENTS

| TW | 201350939 A | 12/2013 |
|----|-------------|---------|
| TW | 201403144 A | 1/2014  |
| TW | 201416218 A | 5/2014  |
| TW | 201502606 A | 1/2015  |

OTHER PUBLICATIONS

Taiwanese Patent Office action dated Sep. 11, 2015 in corresponding application No. TW 103142710, 7 pages.
KIPO Office action dated Dec. 21, 2015, for Korean priority Patent application 10-2013-0164923, (5 pages).

* cited by examiner

MODULE FOR A LIQUID CRYSTAL DISPLAY COMPRISING A FIRST POLARIZER AND A SECOND POLARIZER HAVING FIRST AND SECOND MACHINE DIRECTIONS AND LIQUID CRYSTAL DISPLAY INCLUDING THE SAME

CROSS-REFERENCE TO RELATED APPLICATION

This application claims priority to and the benefit of Korean Patent Application No. 10-2013-0164923, filed on Dec. 27, 2013 in the Korean Intellectual Property Office, the entire content of which is incorporated herein by reference.

BACKGROUND

1. Technical Field

Embodiments of the present invention are directed toward a module for a liquid crystal display and a liquid crystal display panel including the same.

2. Description of the Related Art

In a module for a liquid crystal display, an upper polarizing plate is placed on one side of a liquid crystal display panel and a lower polarizing plate is placed between the other side of the liquid crystal display panel and a backlight unit such that the absorption axes of the upper and lower polarizing plates are orthogonal to each other. Each of the polarizing plates includes a polarizer and an optical film on at least one surface of the polarizer.

The polarizers are fabricated by stretching a polyvinyl alcohol film in a machine direction (MD) to provide polarized light. As a result, the polarizers can shrink under high temperature conditions or high temperature/humidity conditions. Further, because the generally rectangular polarizers are mounted on the liquid crystal display panel such that the MD of the upper polarizer is orthogonal to the MD of the lower polarizer, the liquid crystal display panel and/or the module for the liquid crystal display can bend when the polarizers shrink. A bent liquid crystal display panel and/or the module for a liquid crystal display can lead to distortion of the absorption axes near the corners of the polarizers, which can cause light to leak and a deterioration in processability.

SUMMARY

A aspects of embodiments of the present invention are directed toward a module for a liquid crystal display which includes: a liquid crystal display panel; a first polarizer on a first side (e.g., on an upper side) of the liquid crystal display panel; and a second polarizer on a second side (e.g on a lower side) of the liquid crystal display panel. The first polarizer has a length (i.e., a long dimension) in a machine direction, the second polarizer has a width (i.e., a short dimension) in the machine direction, a shrinkage force of the second polarizer is greater than a shrinkage force of the first polarizer.

According to aspects of embodiments of the present invention, a liquid crystal display panel may include the module for the liquid crystal display as set forth above.

DETAILED DESCRIPTION

Figure 1:
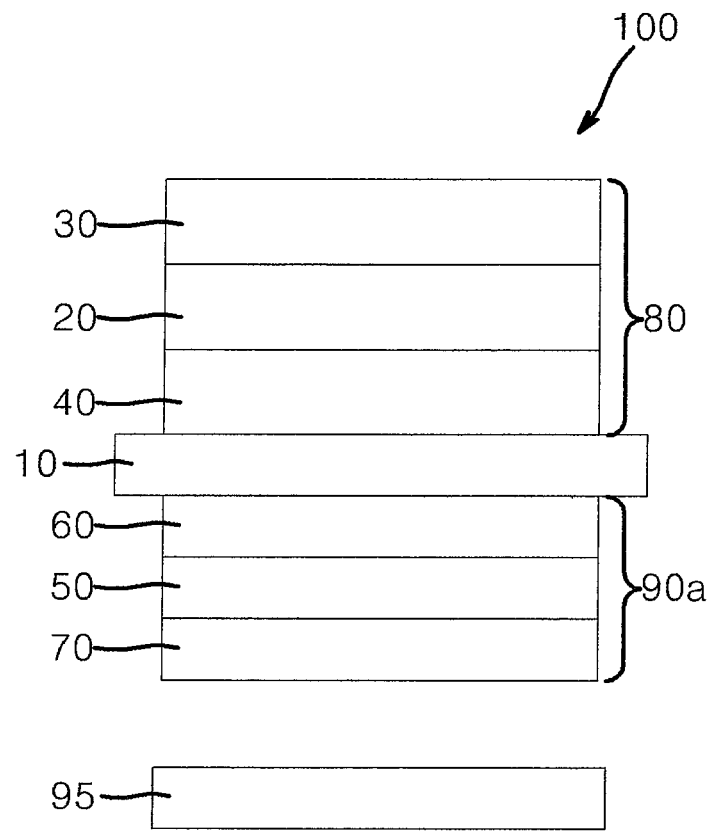
FIG. 1 is a schematic cross-sectional view of a module for a liquid crystal display according to embodiments of the present invention.

Example embodiments of the present invention are described with reference to the accompanying drawings. It should be understood that the present invention may be embodied in different ways and is not limited to the described embodiments. In the drawings, portions irrelevant to the description are omitted for clarity. Like components are denoted by like reference numerals throughout the specification. As used herein, directional terms such as "upper portion (side, or surface)" and "lower portion (side, or surface)" are defined with reference to the accompanying drawings. Thus, it will be understood that the term "upper portion (side, or surface)" can be used interchangeably with the term "lower portion (side, or surface)". It will be understood that, when a layer is referred to as being formed "on" another layer, the layer can be formed directly on the other layer, or it can be indirectly on the other layer with one or more intervening layers therebetween. When a layer is referred to as being "directly formed on" another layer, an intervening layer is not present.

Figure 4:
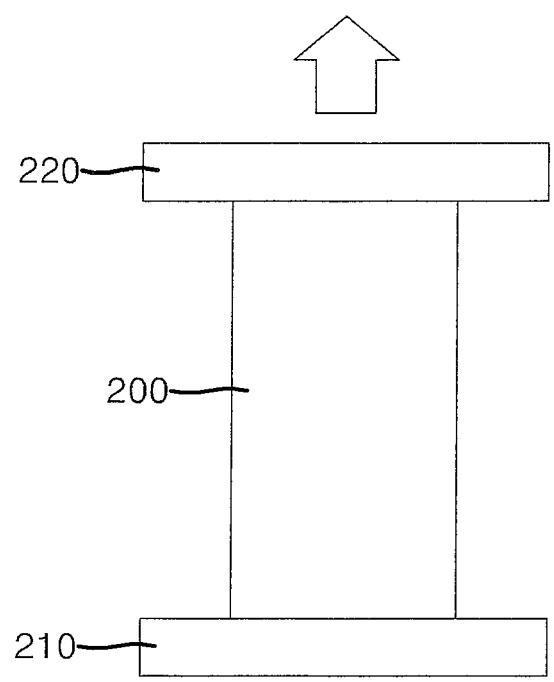
FIG. 4 is a diagram illustrating a method for measuring shrinkage force according to embodiments of the present invention.
Figure 5:
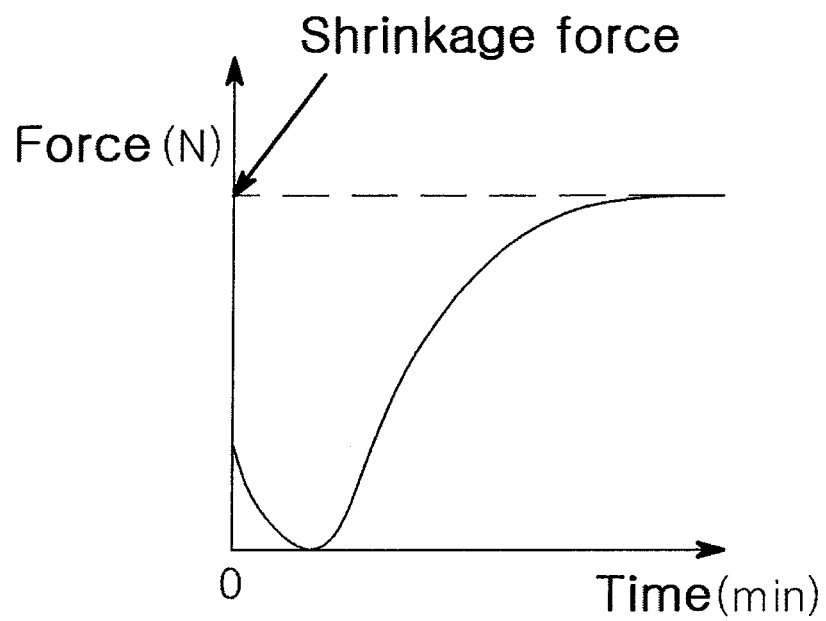
FIG. 5 is a conceptual graph illustrating shrinkage force.

Referring to FIG. 4, the "shrinkage force," according to embodiments of the invention, was obtained by the following method. First, a specimen 200 having a size of 120 mm×10 mm×10 μm (length×width×thickness) to 120 mm×10 mm×25 μm (length×width×thickness) was sampled from a middle or end portion of a polarizer. Then, with a distal end of the specimen 200 connected to a first jig 210 of a Texture Analyzer (Texture Technologies) and the other end of the specimen 200 connected to a second jig 220, a distance between the first and second jigs 210, 220 was adjusted to 100 mm. Herein, a longitudinal direction of the specimen is denoted the "machine direction" (or MD), and a direction transverse to the machine direction is denoted the "transverse direction" (or TD). The first jig 210 is a stationary jig and the second jig 220 is a movable jig, such that the location of the second jig 220 varies upon contraction of the polarizer. The first jig 210, the second jig 220, and the specimen 200 were then placed in a chamber and the temperature of the chamber was increased to 100° C. and maintained for 4 hours. The magnitude of the force N required to maintain a distance between the first and second jigs 210, 220 of 100 mm at 100° C. was measured over time. Referring to FIG. 5, a graph depicts the measured magnitude of force (N) required to maintain the 100 mm distance between the first and second jigs 210, 220 according to time in minutes. Shrinkage force is defined as the magnitude of constant force required to maintain the distance between the first and second jigs 210, 220 (or the force that results in a saturation state).

As used herein, the term length refers to the longer side of a rectangular polarizer and the term width refers to the shorter side of the rectangular polarizer, unless otherwise specified.

According to embodiments of the present invention, a module for a liquid crystal display includes: a liquid crystal display panel; a first polarizer on a first side (or on an upper side) of the liquid crystal display panel; and a second polarizer on a second side (or on a lower side) of the liquid crystal display panel. The first polarizer is oriented such that the length of the polarizer extends in a machine direction (MD), the second polarizer is oriented such that the width of the polarizer extends in the MD, and a shrinkage force of the second polarizer is greater than a shrinkage force of the first polarizer. When exposed to sufficient heat to cause shrinkage, the first polarizer is bent in the MD (or along the length of the first polarizer) and the second polarizer is bent in the MD (or along the width of the second polarizer). Thus, when the shrinkage force of the second polarizer is adjusted to be greater than the shrinkage force of the first polarizer, it is possible to suppress (or reduce) bending of the polarizers by offsetting the degrees of bending between the first polarizer and the second polarizer.

The polarizer may include at least one of an optical functional film(s), an adhesive layer(s) and/or a coating layer(s) on one or both surfaces of the polarizer.

The optical functional film may include at least one of an optical sheet, such as a protective film, a retardation film (for example, a zero-retardation film), a brightness enhancement film, a prism sheet, and the like.

The optical functional film may be a transparent resin film. For example, in some embodiments, the optical functional film may be a film formed of at least one resin selected from polyester resins including polyethylene terephthalate, polybutylene terephthalate, polyethylene naphthalate, polybutylene naphthalate, and the like, cyclic polyolefin resins, polycarbonate resins, polyethersulfone resins, polysulfone resins, polyamide resins, polyimide resins, polyolefin resins, polyarylate resins, polyvinyl alcohol resins, polyvinyl chloride resins, and polyvinylidene chloride resins.

The optical functional film may have a thickness of about 10 μm to about 100 μm. Within this thickness range, the optical functional film may be used in the module for a liquid crystal display. For example, in some embodiments the optical functional film may have a thickness of about 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, or 100 μm.

The optical functional film may have a functional layer(s) on one or both surfaces of the optical functional film. The functional layer may be a hard coating layer, an anti-reflection layer, an anti-fingerprint layer, and/or a primer layer for bonding with the polarizer.

The adhesive layer may be formed of at least one of a pressure sensitive adhesive and/or a UV-curable adhesive. For example, the adhesive layer may be formed of a composition including a (meth)acrylic copolymer and a curing agent. The adhesive layer may have a thickness of about 1 μm to about 50 μm. Within this thickness range, the adhesive layer may be used in the module for a liquid crystal display. For example, in some embodiments, the adhesive layer may have a thickness of about 1 μm, 2 μm, 3 μm, 4 μm, 5 μm, 6 μm, 7 μm, 8 μm, 9 μm, 10 μm, 15 μm, 20 μm, 25 μm, 30 μm, 35 μm, 40 μm, 45 μm, or 50 μm.

The coating layer may be composed of a cured product of an active-energy ray curable resin composition, which includes an active-energy ray curable compound and a polymerization initiator. The coating layer may secure (or achieve) good adhesion to the polarizer, transparency, mechanical strength, thermal stability, moisture blocking performance, and durability.

The active-energy ray curable compound may be a compound that can be cured by irradiation of active-energy rays. For example, the active-energy ray curable compound may include at least one of a cation polymerizable curable compound, a radical polymerizable curable compound, a urethane resin, and/or a silicone resin.

The cation polymerizable curable compound may include at least one of an epoxy compound containing at least one epoxy group in the backbone and/or an oxetane compound containing at least one oxetane ring in the backbone.

The epoxy compound may include at least one of a hydrogenated epoxy compound, an aliphatic epoxy compound, an alicyclic epoxy compound, and/or an aromatic epoxy compounds. For example, the epoxy compound may be at least one of a hydrogenated epoxy compound, an aliphatic epoxy compound, and/or an alicyclic epoxy compounds, all of which do not have an aromatic ring.

The hydrogenated epoxy compound refers to a resin obtained by selective hydrogenation of an aromatic epoxy compound in the presence of a catalyst under pressure. Examples of the aromatic epoxy compound may include bisphenol type epoxy resins, such as diglycidyl ethers of bisphenol A, diglycidyl ethers of bisphenol F, and diglycidyl ethers of bisphenol S; and novolac type epoxy resins, such as phenol novolac epoxy resins, cresol novolac epoxy resins, and hydroxybenzaldehyde phenol novolac epoxy resins; and polyfunctional epoxy resins, such as glycidyl ethers of tetrahydroxydiphenylmethane, glycidyl ethers of tetrahydroxybenzophenone, epoxylated polyvinyl phenol, and the like.

The aliphatic epoxy compounds may include polyglycidyl ethers of aliphatic polyhydric alcohols or alkylene oxide adducts thereof. For example, the aliphatic epoxy compounds may be diglycidyl ethers of 1,4-butanediol, diglycidyl ethers of 1,6-hexanediol, triglycidyl ethers of glycerin, triglycidyl ethers of trimethylolpropane, diglycidyl ethers of polyethylene glycol, diglycidyl ethers of propylene glycol, polyglycidyl ethers of polyether polyols produced by adding one or more alkylene oxides to aliphatic polyhydric alcohols such as ethylene glycol, propylene glycol, or glycerin.

The alicyclic epoxy compound refers to an epoxy compound having at least one epoxy group coupled to an alicyclic ring. Herein, the "epoxy group coupled to an alicyclic ring" has a structure represented by Formula 1:

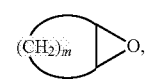

Formula 1

In Formula 1, m is an integer of 2 to 5.

Non-limiting examples of the alicyclic epoxy compound include 3,4-epoxycyclohexylmethyl 3,4-epoxycyclohexanecarboxylate, 3,4-epoxy-6-methylcyclohexylmethyl 3,4-epoxy-6-methylcyclohexanecarboxylate, ethylene bis(3,4-epoxycyclohexanecarboxylate), bis(3,4-epoxy-6-methylcyclohexylmethyl)adipate, diethylene glycol bis(3,4-epoxycyclohexylmethylether), ethylene glycol bis(3,4-epoxycyclohexylmethylether), 2,3,14,15-diepoxy-7,11,18,21-tetraoxaspiro[5.2.2.5.2.2]heneicosane, 3-(3,4-epoxycyclohexyl)-8,9-epoxy-1,5-dioxaspiro[5.5]undecane, 4-vinylcyclohexene dioxide, limonene dioxide, bis(2,3-epoxycyclopentyl)ether, dicyclopentadiene dioxide, and the like.

The aromatic epoxy compound may include at least one of bisphenol A, bisphenol F, a phenol novolac, a cresol novolac, a bisphenol A-novolac, a dichloropentadiene novolac, a glycidyl ether of triphenylmethane, triglycidyl p-aminophenol, and/or tetraglycidyl methylene dianiline.

The oxetane compound may be a compound having a four-membered cyclic ether in the molecule. For example, the oxetane compound may include 3-ethyl-3-hydroxymethyloxetane, 1,4-bis[(3-ethyl-3-oxetanyl)methoxymethyl]benzene, 3-ethyl-3-(phenoxymethyl)oxetane, di[(3-ethyl-3-oxetanyl)methyl]ether, 3-ethyl-3-(2-ethylhexyloxymethyl) oxetane, phenolnovolac oxetane, or the like.

In some embodiments, the radical polymerizable curable compound may include a (meth)acrylic compound having at least one (meth)acryloyloxy group. Here, the term "(meth) acryloyloxy group" may refer to an acryloyloxy group and/or a methacryloyloxy group. The radical polymerizable curable compound may realize a coating layer that exhibits good hardness and mechanical strength and has high durability.

In other embodiments, the radical polymerizable curable compound may be obtained by reacting a (meth)acrylate monomer having at least one (meth)acryloyloxy group with two or more types of functional group-containing compounds, and may be a (meth)acryloyloxy group-containing compound, such as a (meth)acrylate oligomer or the like, which has two or more (meth)acryloyloxy groups in the molecule. These may be used alone or in combination.

Non-limiting examples of the (meth)acrylate monomer include monofunctional (meth)acrylate monomers having a single (meth)acryloyloxy group in the molecule, bifunctional (meth)acrylate monomers having two (meth)acryloyloxy groups in the molecule, and polyfunctional (meth) acrylate monomers having three or more (meth)acryloyloxy groups in the molecule.

Non-limiting examples of the monofunctional (meth) acrylate monomer include tetrahydrofurfuryl (meth)acrylate, 2-hydroxyethyl(meth)acrylate, 2- or 3-hydroxypropyl (meth)acrylate, 2-hydroxybutyl (meth)acrylate, 2-hydroxy-3-phenoxypropyl (meth)acrylate, isobutyl (meth)acrylate, t-butyl(meth)acrylate, 2-ethylhexyl (meth)acrylate, cyclohexyl (meth)acrylate, dicyclopentenyl (meth)acrylate, benzyl (meth)acrylate, isobornyl (meth)acrylate, phenoxyethyl (meth)acrylate, dicyclopentenyloxyethyl (meth)acrylate, dimethylaminoethyl (meth)acrylate, and the like.

The monofunctional (meth)acrylate monomer may include a (meth)acrylate monomer having a carboxyl group. For example, the monofunctional (meth)acrylate monomer may include 2-(meth)acryloyloxyethyl phthalic acid, 2-(meth)acryloyloxyethyl hexahydro phthalic acid, carboxyethyl (meth)acrylate, 2-(meth)acryloyloxyethyl succinic acid, or the like.

The bifunctional (meth)acrylate monomer may include alkylene glycol di(meth)acrylates, polyoxyalkylene glycol di(meth)acrylates, halogenated alkylene glycol di(meth) acrylates, di(meth)acrylates of aliphatic polyols, di(meth) acrylates of hydrogenated dicyclopentadiene or tricyclodecane dialkanol, di(meth)acrylates of dioxane glycol or dioxane dialkanol, di(meth)acrylates of bisphenol A or bisphenol F with alkylene oxide adducts, or epoxy di(meth) acrylates of bisphenol A or bisphenol F.

The tri- or higher functional (meth)acrylate monomer may include glycerine tri(meth)acrylate, trimethylol propane tri (meth)acrylate, ditrimethylol propane tri(meth)acrylate, ditrimethylolpropane tetra(meth)acrylate, pentaerythritol tri (meth)acrylate, pentaerythritol tetra(meth)acrylate, dipentaerythritol tetra(meth)acrylate, dipentaerythritol penta (meth)acrylate, dipentaerythritol hexa(meth)acrylate, or the like.

The (meth)acrylate oligomers may include a urethane (meth)acrylate oligomer, a polyester (meth)acrylate oligomer, an epoxy (meth)acrylate oligomer, or the like.

In embodiments, the active energy ray-curable compound includes a mixture of an epoxy compound and an oxetane compound, in which the epoxy compound may be present in an amount of about 40% by weight (wt %) to about 95 wt %. For example, in some embodiments, the epoxy compound may be present in an amount of about 40 wt %, 45 wt %, 50 wt %, 55 wt %, 60 wt %, 65 wt %, 70 wt %, 75 wt %, 80 wt %, 85 wt %, 90 wt %, or 95 wt % in the mixture. In addition, the oxetane compound may be present in an amount of about 5 wt % to about 60 wt % in the mixture. For example, in some embodiments, the oxetane compound may be present in an amount of about 5 wt %, 10 wt %, 15 wt %, 20 wt %, 25 wt %, 30 wt %, 35 wt %, 40 wt %, 45 wt %, 50 wt %, 55 wt %, or 60 wt % in the mixture.

The polymerization initiator may include at least one of a photo-radical polymerization initiator and/or a photo-cationic polymerization initiator.

Any photo-radical polymerization initiator capable of performing photocurable reactions may be used without limitation. Non-limiting examples of the photo-radical polymerization initiator may include phosphorus, triazine, acetophenone, benzophenone, thioxanthone, benzoin, oxime initiators, and mixtures thereof. In some embodiments, bisbenzoylphenyl phosphine oxide, benzoyldiphenyl phosphine oxide, and/or mixtures thereof may be used as the photo-radical polymerization initiator.

Any photo-cationic polymerization initiator capable of performing photocurable reactions may be used without limitation. For example, in some embodiments, the photo-cationic polymerization initiator may include an onium salt including an onium ion corresponding to a cation. Non-limiting examples of the onium ion may include: diaryliodonium ions such as diphenyliodonium, 4-methoxydiphenyliodonium, bis(4-methylphenyl)iodonium, bis(4-tert-butylphenyl)iodonium, bis(dodecylphenyl)iodonium, and the like; triarylsulfonium ions such as triphenylsulfonium, diphenyl-4-thiophenoxyphenylsulfonium, and the like; bis [4-(diphenylsulfonio)-phenyl]sulfide; bis[4-(di(4-(2-hydroxyethyl)phenyl)sulfonio)-phenyl]sulfide; η-5-2,4-(cyclopentadienyl)[1,2,3,4,5,6-η]-(methylethyl)-benzene]-iron ($^{1+}$), and the like. Non-limiting examples of the anion may include tetrafluoroborate ($BF^{4-}$), hexafluorophosphate ($PF^{6-}$), hexafluoroantimonate ($SbF^{6-}$), hexafluoroarsenate ($AsF^{6-}$), hexachloroantimonate ($SbCl^{6-}$), and the like.

The polymerization initiator may be present in an amount of about 0.01 parts by weight to about 10 parts by weight based on a total amount of 100 parts by weight of the active energy ray-curable compound. Within this range, the polymerization initiator can secure (or achieve) sufficient curing of the composition to provide good mechanical strength and good adhesion to the polarizer. For example, in some embodiments, the polymerization initiator may be present in an amount of about 0.01, 0.05, 0.1, 0.2, 0.5, 1, 2, 3, 4, 5, 6, 7, 8, 9, or 10 parts by weight.

The active energy ray-curable compound may further include an additive such as a silicone leveling agent, a UV absorbent, an antistatic agent, and/or the like. The additives may be present in an amount of about 0.01 parts by weight to about 1 part by weight based on a total amount of 100 parts by weight of the active energy ray-curable compound. For example, in some embodiments, the additive may be present in an amount of about 0.01, 0.02, 0.03, 0.04, 0.05, 0.1, 0.15, 0.2, 0.3, 0.4, 0.5, 0.6, 0.7, 0.8, 0.9, or 1 part by weight.

The coating layer may have a thickness of about 0.1 μm to about 10 μm. For example, in some embodiments the coating layer may have a thickness of about 0.1 μm, 0.2 μm, 0.3 μm, 0.4 μm, 0.5 μm, 0.6 μm, 0.7 μm, 0.8 μm, 0.9 μm, 1 μm, 2 μm, 3 μm, 4 μm, 5 μm, 6 μm, 7 μm, 8 μm, 9 μm, or 10 μm.

A module for a liquid crystal display according to an embodiment of the present invention will be described with reference to FIG. 1. FIG. 1 is a schematic cross-sectional view of a module for a liquid crystal display according to embodiments of the present invention.

Referring to FIG. 1, a module for a liquid crystal display 100 according to embodiments of the present invention includes a liquid crystal display panel 10, a first polarizing plate 80 on a first side (or an upper side) of the liquid crystal display panel 10, and a second polarizing plate 90a formed on a second side (or a lower side) of the liquid crystal display panel 10 between the liquid crystal display panel 10 and a backlight unit 95. The first polarizing plate 80 includes a first polarizer 20, and a first protective film 30 and a second protective film 40 on the first polarizer 20, and the second polarizing plate 90a includes a second polarizer 50, and a third protective film 60 and a fourth protective film 70 on the second polarizer 50. Here, the shrinkage force of the second polarizer 50 is greater than the shrinkage force of the first polarizer 20.

In some embodiments of the module for a liquid crystal display 100, the shrinkage force of the second polarizer 50 is adjusted to be greater than the shrinkage force of the first polarizer 20, thereby limiting (or suppressing) bending of the liquid crystal display panel 10 and allowing the module for a liquid crystal display 100 to be flattened. In general, when the first polarizer 20 and the second polarizer 50 have the same shrinkage force, bending of the liquid crystal display panel 10 can be suppressed (or reduced). However, according to embodiments of the present invention, the first polarizer 20 and the second polarizer 50 are formed such that an absorption axis or transmission axis of one polarizer is orthogonal to the absorption axis or transmission axis of the other polarizer, and both the first polarizer 20 and the second polarizer 50 each have a rectangular shape in which the length of the polarizer is longer than the width of the polarizer. For example, a ratio of the length of the polarizer to the width of the polarizer exceeds about 1, and the ratio may range from about 1.01 to about 5. In some embodiments, the ratio may be about 1.01, 1.05, 1.1, 1.15, 1.2, 1.25, 1.3, 1.35, 1.4, 1.45, 1.5, 1.55, 1.6, 1.7, 1.8, 1.9, 2, 2.5, 3, 3.5, 4, 4.5, or 5. Considering this construction, when the shrinkage force of the second polarizer 50 is greater than the shrinkage force of the first polarizer 20, it is possible to prevent the liquid crystal display panel 10 from bending and to prevent (or reduce the risk of) distortion of an optical axis by suppressing (or reducing) bending of the first polarizing plate 80 and the second polarizing plate 90a at the corners of the first polarizing plate 80 and the second polarizing plate 90a.

Figure 2:
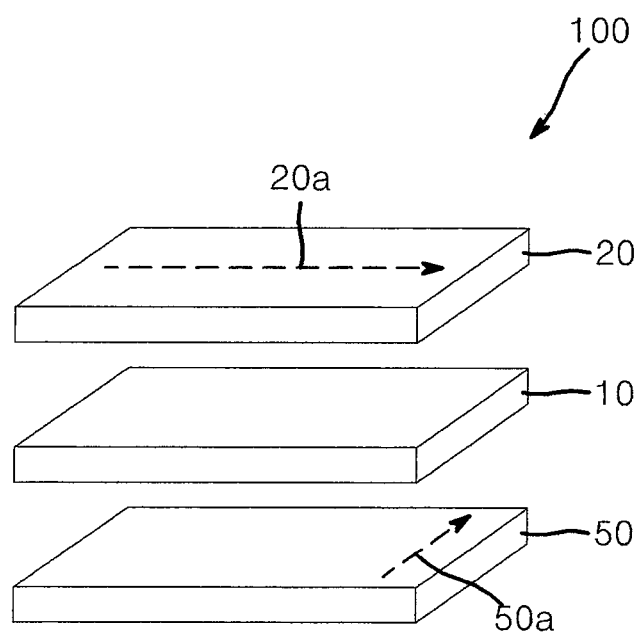
FIG. 2 is an exploded out perspective view of a module for a liquid crystal display according to embodiments of the present invention.

FIG. 2 is an exploded perspective view of the module for a liquid crystal display according to embodiments of the present invention. Referring to FIG. 2, the first polarizer 20 is on the upper side of the liquid crystal display panel 10 and the second polarizer 50 is formed on the lower side of the liquid crystal display panel 10, such that the MD of the first polarizer 20 corresponding to an absorption axis 20a of the first polarizer 20 is orthogonal to the MD of the second polarizer 50 corresponding to an absorption axis 50a of the second polarizer 50. When the shrinkage force of the second polarizer 50 (oriented such that the width extends in the MD) is adjusted to be greater than the shrinkage force of the first polarizer 20 (oriented such that the length extends in the MD), it is possible to prevent (or suppress) bending that would typically occur as a result of thermal shrinkage of the first and second polarizers 20, 50.

The ratio of the shrinkage force of the second polarizer 50 to the shrinkage force of the first polarizer 20 may be greater than about 1. In some embodiments, the ratio may range from about 1.01 to about 2. Within these ranges, bending of the liquid crystal display panel can be prevented (or suppressed) and the liquid crystal display panel 10 can be used in a module for the liquid crystal display. For example, the ratio of the shrinkage force of the second polarizer to the shrinkage force of the first polarizer may be about 1.01, 1.02, 1.03, 1.04, 1.05, 1.06, 1.07, 1.08, 1.09, 1.1, 1.15, 1.2, 1.25, 1.3, 1.35, 1.4, 1.45, 1.5, 1.55, 1.6, 1.7, 1.8, 1.9, or 2. In some embodiments, for example, the ratio may be in a range from about 1.04 to about 1.6.

In some embodiments, the shrinkage force of the first polarizer 20 may be about 9.5 N to about 18 N. Within this range, bending of the liquid crystal display panel 10 can be prevented (or suppressed) and the liquid crystal display panel 10 can be used in the module for the liquid crystal display 100. For example, the shrinkage force of the first polarizer 20 may be about 9.5 N, 9.6 N, 9.7 N, 9.8 N, 9.9 N, 10 N, 10.5 N, 11 N, 11.5 N, 12 N, 12.5 N, 13 N, 13.5 N, 14 N, 14.5 N, 15 N, 15.5 N, 16 N, 16.5 N, 17 N, 17.5 N, and 18 N.

In addition, the shrinkage force of the second polarizer 50 may be about 10 N to about 23 N. Within this range, bending of the liquid crystal display panel 10 can be prevented (or suppressed) and the liquid crystal display panel 10 can be used in the liquid crystal display 100. For example, the shrinkage force of the second polarizer 50 may be about 10 N, 10.5 N, 11 N, 11.5 N, 12 N, 12.5 N, 13 N, 13.5 N, 14 N, 14.5 N, 15 N, 15.5 N, 16 N, 16.5 N, 17 N, 17.5 N, 18 N, 18.5 N, 19 N, 19.5 N, 20 N, 20.5 N, 21 N, 21.5 N, 22 N, 22.5 N, or 23 N.

Each of the polarizers may be prepared to a predetermined thickness using a polyvinyl alcohol film through a washing bath, a swelling bath, a dyeing bath, a stretching bath, and/or a crosslinking bath. In some embodiments of the present invention, the concentration of a crosslinking agent in the crosslinking bath, and the stretching temperature in the stretching bath, are controlled during fabrication of the polarizers such that the first and second polarizers 20, 50 can have different shrinkage forces.

Embodiment of the first polarizer 20 may be fabricated according to the following process.

(1) Polyvinyl Alcohol Film

Any suitable polyvinyl alcohol film for polarizers may be used. For example, a film produced from polyvinyl alcohol or a derivative thereof may be used. The polyvinyl alcohol film may have a degree of polymerization of about 1,000 to about 5,000. Within this range, the polyvinyl alcohol film can be used to produce a thin polarizer. For example, the polyvinyl alcohol film may have a degree of polymerization of about 1,000, 1,500, 2,000, 2,500, 3,000, 3,500, 4,000, 4,500, or 5,000.

The polyvinyl alcohol film may have a degree of saponification of about 80 mol % to about 100 mol %. Within this range, the polyvinyl alcohol film can be used to fabricate a thin polarizer. For example, the polyvinyl alcohol film may have a degree of saponification of about 80 mol %, 81 mol %, 82 mol %, 83 mol %, 84 mol %, 85 mol %, 86 mol %, 87 mol %, 88 mol %, 89 mol %, 90 mol %, 95 mol %, or 100 mol %. The polyvinyl alcohol film may have a thickness of about 1 μm to about 60 μm. Within this range, the polyvinyl alcohol film can be used to fabricate a thin polarizer. For example, the polyvinyl alcohol film may have a thickness of about 1 μm, 2 μm, 3 μm, 4 μm, 5 μm, 6 μm, 7 μm, 8 μm, 9 μm, 10 μm, 15 μm, 20 μm, 25 μm, 30 μm, 35 μm, 40 μm, 45 μm, 50 μm, 55 μm, or 60 μm. In some embodiments, for example, the polyvinyl alcohol film may have a thickness of about 3 μm to about 60 μm.

(2) Swelling Bath

The swelling bath contains water at about 20° C. to about 40° C., and the polyvinyl alcohol film may be dipped in the swelling bath for about 1 minute to about 3 minutes.

(3) Dyeing Bath

The dyeing bath contains an aqueous solution, which includes about 1 wt % to about 5 wt % of a dichroic material, with the balance being water, and has a temperature of about 20° C. to about 30° C. In some embodiments, for example, the aqueous solution may include about 1 wt %, 1.5 wt %, 2 wt %, 2.5 wt %, 3 wt %, 3.5 wt %, 4 wt %, 4.5 wt %, or 5 wt % of a dichroic material. The polyvinyl alcohol film may be dipped in the dyeing bath for about 1 minute to about 5 minutes. The dichroic material may be at least one of potassium iodide, hydrogen iodide, lithium iodide, sodium iodide, zinc iodide, aluminum iodide, lead iodide, and/or copper iodide, but is not limited thereto.

The dyeing bath may further contain a crosslinking agent to promote crosslinking of the dichroic material. The crosslinking agent may include at least one of a boron compound (such as boric acid, sodium borate, and the like), glyoxal, and/or glutaraldehyde.

The shrinkage force of the polarizer is not influenced by the temperature of the dyeing bath, the dipping time in the dyeing bath, or the concentration of the dichroic material in the dyeing bath. In embodiments, the dyeing bath may contain an aqueous solution containing about 3 wt % of the dichroic material and have a temperature of about 30° C., and the polyvinyl alcohol film may be dipped in the dyeing bath for about 3 minutes.

(4) Crosslinking Bath

The polyvinyl alcohol film is dipped in the crosslinking bath which contains a crosslinking agent dissolved in a solvent, thereby securing the dichroic material adhered to the polyvinyl alcohol film to allow for color correction of the polyvinyl alcohol film. The crosslinking bath may contain an aqueous solution, in which the crosslinking agent may be present in an amount of about 1 wt % to about 5 wt %, for example about 1 wt %, 2.5 wt %, 3 wt %, 3.5 wt %, 4 wt %, 4.5 wt %, or 5 wt %. Within any of these ranges, the first polarizer 20 can have a defined shrinkage force. The crosslinking agent may include at least one of a boron compound (such as boric acid, sodium borate, and the like), glyoxal, and glutaraldehyde. The crosslinking bath may have a temperature of about 30° C. to about 40° C., and the polyvinyl alcohol film may be dipped in the crosslinking bath for about 1 minute to about 5 minutes. In one embodiment, the crosslinking bath may contain an aqueous solution containing about 3 wt % of boric acid as the crosslinking agent and have a temperature of about 30° C., and the polyvinyl alcohol film may be dipped in the crosslinking bath for about 3 minutes. In some embodiments, the crosslinking agent may be present in an amount of about 1 wt % to about 4.5 wt %.

(5) Stretching Bath

Stretching may be performed in a wet stretching bath, which contains water or a water-soluble organic solvent and has a temperature of about 50° C. to about 60° C., for example, about 50° C., 51° C., 52° C., 53° C., 54° C., 55° C., 56° C., 57° C., 58° C., 59° C., and 60° C. Within any of these ranges, the first and second polarizers 20, 50 can each secure (or achieve) a defined shrinkage force. Stretching of the polyvinyl alcohol film may be performed to have a total elongation of about 6 times to about 8 times an initial length of the polyvinyl alcohol film. In some embodiments, the wet stretching bath may have a temperature of about 55° C. to about 60° C.

In embodiments, the stretching bath contains water at 50° C. and allows the polyvinyl alcohol film to have an elongation of about 6 times an initial length thereof, and the polyvinyl alcohol film may be dipped in the stretching bath for about 3 minutes.

In order to secure (or achieve) a shrinkage force of the first polarizer 20 of about 9.5 N to about 18 N under the aforementioned conditions of the washing bath, the swelling bath, the dyeing bath, the stretching bath and the crosslinking bath, the conditions of the stretching bath may be adjusted to have at least one of a temperature of about 50° C. to about 60° C. and/or a concentration of the crosslinking agent of about 1 wt % to about 5 wt %.

The polyvinyl alcohol film may be washed with a cleaning solvent in order to remove (or reduce the amount of) foreign matter and/or to improve dyeing efficiency before the swelling process in the swelling bath. Since washing does not physically and/or chemically influence the polyvinyl alcohol film, the washing process does not influence the shrinkage force of the polarizer. The cleaning solvent may be water at room temperature (for example, 25° C.), distilled water, or a mixture thereof.

After the polyvinyl alcohol film has passed through the crosslinking bath, the polyvinyl alcohol film may be washed or dried. The polyvinyl alcohol film may be washed with a cleaning solvent such as water, and may be dried at a temperature of about 20° C. to about 30° C. for about 1 minute to about 10 minutes. Since washing and drying do not physically and/or chemically influence the polyvinyl alcohol film, the washing or drying process does not influence the shrinkage force of the polarizer.

In order to secure (or achieve) a shrinkage force of the second polarizer 50 of about 10 N to about 23 N under the aforementioned conditions of the washing bath, the swelling bath, the dyeing bath, the stretching bath and the crosslinking bath, the conditions of the stretching bath may be adjusted to have either a temperature of about 50° C. to about 60° C. or a concentration of the crosslinking agent of about 3 wt % to about 5 wt %, provided that at least one of the following conditions (i) and (ii) can be satisfied in order to allow the second polarizer to 50 have a greater shrinkage force than the first polarizer 20:

(i) $C2>C1$ (where $C2$ is the concentration of the crosslinking agent in the crosslinking bath in preparation of the second polarizer 50, and $C1$ is the concentration of the crosslinking agent in the crosslinking bath in preparation of the first polarizer 20); and (ii) $T2>T1$ (where $T2$ is the temperature of the stretching bath in preparation of the second polarizer 50 and $T1$ is the temperature of the stretching bath in preparation of the first polarizer 20).

In some embodiments, the first polarizer 20 may have a thickness of about 5 μm to about 25 μm, for example, about 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, or 25 μm. The second polarizer 50 may have a thickness of about 5 μm to about 25 μm, for example, about 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, or 25 μm. The thicknesses of the polarizers can be adjusted by controlling the elongation and the content of additives.

A ratio of the thickness of the second polarizer 50 to the thickness of the first polarizer 20 may be greater than or equal to about 1, for example, about 1 to about 3. For example, the ratio may be about 1.01, 1.05, 1.1, 1.15, 1.2, 1.25, 1.3, 1.35, 1.4, 1.45, 1.5, 1.55, 1.6, 1.7, 1.8, 1.9, 2, 2.1, 2.2, 2.3, 2.4, 2.5, 2.6, 2.7, 2.8, 2.9, or 3. Within any of these ranges, the polarizers can suppress (or reduce) bending of the liquid crystal display panel 10. For example, it is possible to prevent (or reduce risk of) distortion of an optical axis by suppressing (or reducing) bending of the first polarizing plate 80 and the second polarizing plate 90a at the corners thereof.

A ratio of the thickness of the first polarizing plate 80 to the thickness of the second polarizing plate 90a (thickness of the first polarizing plate/thickness of the second polarizing plate) may be greater than or equal to about 1, for example, about 1 to about 3. For example, in some embodiments the ratio may be about 1.01, 1.05, 1.1, 1.15, 1.2, 1.25, 1.3, 1.35, 1.4, 1.45, 1.5, 1.55, 1.6, 1.7, 1.8, 1.9, 2, 2.1, 2.2, 2.3, 2.4, 2.5, 2.6, 2.7, 2.8, 2.9, or 3. In instances where the thickness of the first polarizing plate 80 is greater than or the same as the thickness of the second polarizing plate 90a, the module for a liquid crystal display 100 does not bend (or bend only a negligible amount) because the shrinkage force of the second polarizer 50 is greater than that of the first polarizer 20.

The first polarizing plate 80 may have a thickness of about 10 µm to about 200 µm, for example, about 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, or 200 µm. The second polarizing plate 90a may have a thickness of about 10 µm to about 200 µm, for example, about 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, or 200 µm. Within any of these thickness ranges, the first and second polarizing plates 80, 90a can be used in a liquid crystal display panel.

The liquid crystal display panel 10 includes a liquid crystal cell layer embedded between an upper substrate and a lower substrate, in which the upper substrate may be a color filter (CF) substrate and the lower substrate may be a thin film transistor (TFT) substrate. The upper substrate and the lower substrate may be formed of the same or different materials, and may be glass substrates or plastic substrates. The plastic substrates may be formed of any plastic material applicable to flexible displays. For example, the plastic substrates may be formed of a plastic material such as polyethylene terephthalate (PET), polycarbonate (PC), polyimide (PI), polyethylene naphthalate (PEN), polyether sulfone (PES), polyacrylate (PAR), cycloolefin copolymers (COC), or the like, but the plastic substrates are not limited thereto. The liquid crystal cell layer may include liquid crystal cells arranged in a vertical alignment (VA) mode, an in-place switching (IPS) mode, a fringe field switching (FFS) mode, or a twisted nematic (TN) mode.

In some embodiments, the first polarizing plate 80 and the second polarizing plate 90a may be formed on one side of the liquid crystal display panel via an adhesive layer, which may be formed of any suitable I adhesive (for example, a pressure sensitive adhesive).

Figure 3:
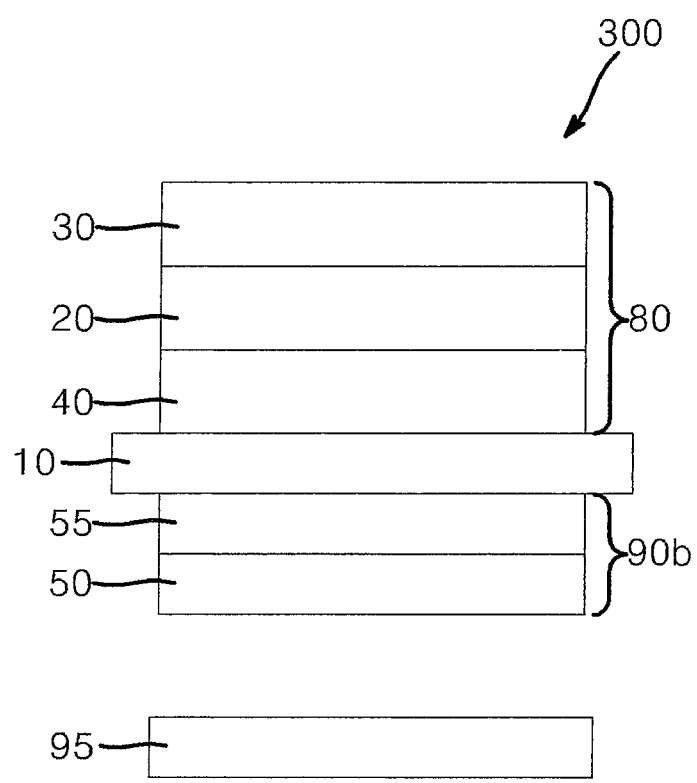
FIG. 3 is a schematic cross-sectional view of a module for a liquid crystal display according to embodiments of the present invention.

FIG. 3 is a sectional view of a module for a liquid crystal display according to embodiments of the invention. Referring to FIG. 3, the module for a liquid crystal display 300 includes a liquid crystal display panel 10, a first polarizing plate 80 on a first side (or an upper side) of the liquid crystal display panel 10, and a second polarizing plate 90b on a second side (or on a lower side) of the liquid crystal display panel 10 between the liquid crystal display panel 10 and a backlight unit 95. The first polarizing plate 80 includes a first polarizer 20, and a first protective film 30 and a second protective film 40 on the first polarizer 20, and the second polarizing plate 90b includes a second polarizer 50 and an adhesive layer 55 on the second polarizer 50. Here, the shrinkage force of the second polarizer 50 may be greater than the shrinkage force of the first polarizer 20. The module for a liquid crystal display according to the embodiments described here is substantially the same as the module for a liquid crystal display according to the above embodiments except that the third and fourth protective films are omitted and the adhesive layer 55 is formed.

A liquid crystal display panel according to embodiments of the present invention may include the module for a liquid crystal display.

According to embodiments of the present invention, the liquid crystal display panel may include a backlight unit and a module for a liquid crystal display, which includes a liquid crystal display panel, a first polarizing plate on a first side (or an upper side) of the liquid crystal display panel, and a second polarizing plate on a second side (or a lower side) of the liquid crystal display panel between the liquid crystal display panel and the backlight unit.

Hereinafter, embodiments of the present invention will be with reference to some examples. It should be understood that these examples are provided for illustration only and are not to be construed in any way as limiting the present invention.

Preparative Example 1

A polyvinyl alcohol film (VF-PE3000, Kuraray K.K., Japan, thickness: 30 µm) was washed with water. A swelling bath containing water at 30° C. was prepared and the polyvinyl alcohol film was dipped in the swelling bath for 3 minutes. Thereafter, a dyeing bath containing an aqueous solution with 3 wt % of potassium iodide at 30° C. was prepared, and the polyvinyl alcohol film was dipped in the dyeing bath for 1 minute to 3 minutes.

Thereafter, a crosslinking bath containing an aqueous solution with 3 wt % of boric acid at 30° C. was prepared, and the polyvinyl alcohol film was subjected to crosslinking treatment by dipping the polyvinyl alcohol film in the crosslinking bath for 3 minutes. Then, a stretching bath containing water at 50° C. was prepared and the polyvinyl alcohol film was dipped in the stretching bath for 3 minutes to stretch the polyvinyl alcohol film to an elongation ratio of 6 times the initial length of the polyvinyl alcohol film.

After crosslinking and stretching, the polyvinyl alcohol film was washed with water and dried at 60° C. for 5 minutes, thereby preparing a polarizer with a thickness of 10 µm.

A specimen having a size of 120 mm×10 mm×10 µm (length×width×thickness) was sampled from a middle portion of the polarizer. Then, with a distal end of the specimen connected to a first jig of a Texture Analyzer (Texture Technologies) and the other end of the specimen connected to a second jig, the distance between the first and second jigs was adjusted to 100 mm. Herein, a longitudinal direction of the specimen was denoted as the "machine direction" (or MD), and a direction transverse to the MD was denoted the "transverse direction" (or TD). In addition, the first jig is a stationary jig and the second jig is a movable jig, the location of which varies upon contraction of the polarizer. Then, the first jig, the second jig, and the specimen were placed in a chamber and the temperature of the chamber was increased to 100° C. and then maintained for 4 hours. Thereafter, the magnitude of force N required to maintain a distance between the first and second jigs of 100 mm at 100° C. was measured over time. The magnitude of force (N) according to time in minutes was graphed, allowing for calculation of the shrinkage force. Results are shown in Table 1.

Preparative Examples 2 to 9

In preparative examples 2 to 9, polarizers were as in Preparative Example 1, with modifications to the concentration of boric acid in the crosslinking bath and the temperature of the stretching bath, as noted in Table 1. The shrinkage force of the polarizers was measured as described in Preparative Example 1.

TABLE 1

|  | Thickness of polyvinyl alcohol (μm) | Thickness of polarizer (μm) | Concentration of boric acid (wt %) | Temperature of stretching bath (° C.) | Shrinkage force of polarizer (N) |
|---|---|---|---|---|---|
| Preparative Example 1 | 30 | 10 | 3 | 50 | 9.6 |
| Preparative Example 2 | 60 | 25 | 4.5 | 60 | 15.2 |
| Preparative Example 3 | 40 | 15 | 4 | 60 | 11.4 |
| Preparative Example 4 | 60 | 25 | 4.5 | 50 | 17.8 |
| Preparative Example 5 | 60 | 25 | 4.5 | 55 | 22.7 |
| Preparative Example 6 | 40 | 15 | 4 | 50 | 12.5 |
| Preparative Example 7 | 40 | 15 | 4 | 55 | 13.9 |
| Preparative Example 8 | 30 | 10 | 3 | 50 | 10.1 |
| Preparative Example 9 | 30 | 10 | 3 | 55 | 10.6 |

Example 1

A first polarizing plate (length×width, 200 mm×150 mm, where the length of the polarizing plate corresponds to the MD) was prepared by hard coating a triacetylcellulose film (KC4UYW, Konica K.K., Japan, thickness: 40 μm) to one surface of the polarizer of Preparative Example 1 and bonding a triacetylcellulose film (KC4UYW, Konica K.K., Japan, thickness: 40 μm) to the other surface thereof using a bonding agent. A second polarizing plate (length×width, 200 mm×150 mm, where the width of the polarizing plate corresponds to the MD) was prepared by bonding triacetylcellulose films (KC4UYW, Konica K.K., Japan, thickness: 40 μm) to both surfaces of the polarizer of Preparative Example 2 using a bonding agent. The first and second polarizing plates were attached to opposite surfaces of a liquid crystal display panel using an acrylic adhesive, respectively, such that the MD of the first polarizer was orthogonal to the MD of the second polarizer, thereby preparing a module for a liquid crystal display.

Examples 2 to 6 and Comparative Examples 1 to 3

Modules for the liquid crystal display were prepared as in Example 1 with modifications to the type of polarizer as described in Table 2.

Figure 6:
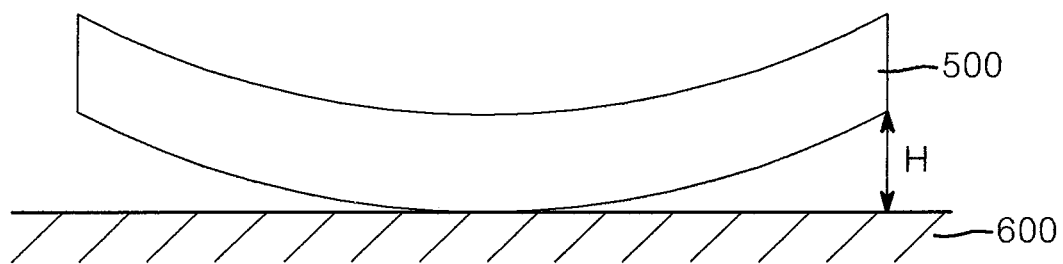
FIG. 6 is a conceptual diagram of a method for measuring the degree of bending.

(1) Measurement of bending degree: The degree of bending was measured with reference to FIG. 6. Referring to FIG. 6, a sample 500 was prepared by attaching the first polarizing plate to one side of a 0.5 cm thick glass sheet and attaching the second polarizing plate to the other side of the glass sheet. The sample was maintained in a chamber at 85° C. for 100 hours and then maintained at 25° C. for 2 hours. A maximum bending height (H) of each of the four corners of the sample 500 from the floor 600 were measured and averaged. Results are shown in Table 2.

(2) Measurement of light leakage: A sample was prepared by attaching the first polarizing plate and the second polarizing plate to both sides of a glass sheet such that the absorption axes of the polarizing plates were aligned orthogonal to each other. The prepared sample was maintained in a chamber at 85° C. for 100 hours and then maintained at 25° C. for 2 hours. The sample was then used in a liquid crystal display panel and the brightness of the liquid crystal display panel was measured at a height of 1 m from a front side of the liquid crystal display panel using a brightness meter (RISA, Hiland Co., Ltd.). Light leakage was then recorded based upon observation with the naked eye, where no light leakage (or no difference in brightness) was rated as ○, slight light leakage (or a slight difference in brightness) was rated as Δ, and significant light leakage (or severe difference in brightness) was rated as x. Results are shown in Table 2.

As shown in Table 2, the module for a liquid crystal display according to embodiments of the present invention,

TABLE 2

|  |  | Example | | | | | | Comparative Example | | |
|---|---|---|---|---|---|---|---|---|---|---|
|  |  | 1 | 2 | 3 | 4 | 5 | 6 | 1 | 2 | 3 |
| Polarizer of first polarizing plate | Kind | Prep. Ex. 1 | Prep. Ex. 1 | Prep. Ex. 3 | Prep. Ex. 4 | Prep. Ex. 6 | Prep. Ex. 8 | Prep. Ex. 2 | Prep. Ex. 1 | Prep. Ex. 2 |
|  | Shrinkage force (N) | 9.6 | 9.6 | 11.4 | 17.8 | 12.5 | 10.1 | 15.2 | 9.6 | 15.2 |
| Polarizer of second polarizing plate | Kind | Prep. Ex. 2 | Prep. Ex. 3 | Prep. Ex. 2 | Prep. Ex. 5 | Prep. Ex. 7 | Prep. Ex. 9 | Prep. Ex. 2 | Prep. Ex. 1 | Prep. Ex. 1 |
|  | Shrinkage force (N) | 15.2 | 11.4 | 15.2 | 22.7 | 13.9 | 10.6 | 15.2 | 9.6 | 9.6 |
| Bending (cm) |  | 1.9 | 2.0 | 2.2 | 2.2 | 0.9 | 0.5 | 6.4 | 3.7 | 7.2 |
| Light leakage |  | ○ | ○ | ○ | ○ | ○ | ○ | X | Δ | X | configured such that shrinkage force of the second polarizer of the second polarizing plate was greater than that of the first polarizer of the first polarizing plate, achieved a low degree of bending and substantially no light leakage.

Conversely, in Comparative Examples 1 and 2, where the shrinkage force of the first polarizer of the first polarizing plate and the second polarizer of the second polarizing plate were equal, and in Comparative Example 3 where the shrinkage force of the second polarizer of the second polarizing plate was lower than the shrinkage force of the first polarizer of the first polarizing plate, significant light leakage was observed with the naked eye.

It should be understood that various modifications, changes, alterations, and equivalent embodiments can be made by those skilled in the art without departing from the spirit and scope of the present invention, as described in the following claims.

What is claimed is:

1. A module for a liquid crystal display, comprising:
    a liquid crystal display panel;
    a first polarizer on a first side of the liquid crystal display panel; and
    a second polarizer on a second side of the liquid crystal display panel,
    wherein the first polarizer has a long dimension in a first machine direction of the first polarizer, the second polarizer has a short dimension in a second machine direction of the second polarizer, and a shrinkage force of the second polarizer is greater than a shrinkage force of the first polarizer, and wherein the first polarizer has a shrinkage force of about 9.5 N to about 18 N, and the second polarizer has a shrinkage force of about 10 N to about 23 N.

2. The module for a liquid crystal display according to claim 1, wherein a ratio of the shrinkage force of the second polarizer to the shrinkage force of the first polarizer is about 1.01 to about 2.

3. The module for a liquid crystal display according to claim 1, wherein a ratio of a thickness of the second polarizer to a thickness of the first polarizer is about 1 to about 3.

4. The module for a liquid crystal display according to claim 1, wherein the first polarizer has a thickness of about 10 μm to about 25 μm and the second polarizer has a thickness of about 10 μm to about 25 μm.

5. The module for a liquid crystal display according to claim 1, wherein a first polarizing plate comprising the first polarizer is on the first side of the liquid crystal display panel, a second polarizing plate comprising the second polarizer is on the second side of the liquid crystal display panel, and a ratio of the thickness of the first polarizing plate to the thickness of the second polarizing plate is about 1 to about 3.

6. The module for a liquid crystal display according to claim 1, wherein each of the first polarizer and the second polarizer is produced by passing a polyvinyl alcohol film through a swelling bath, a dyeing bath, a crosslinking bath and a stretching bath, and each of the shrinkage forces of the first polarizer and the second polarizer are adjusted by altering a concentration of a crosslinking agent in the crosslinking bath and/or a temperature of the stretching bath.

7. The module for a liquid crystal display according to claim 6, wherein each of the first polarizer and the second polarizer satisfies at least one of conditions (i) or (ii):
    (i) $C2>C1$, wherein $C2$ is a concentration of the crosslinking agent in the crosslinking bath for the second polarizer, and $C1$ is a concentration of the crosslinking agent in the crosslinking bath for the first polarizer; or
    (ii) $T2>T1$, wherein $T2$ is a temperature of the stretching bath for the second polarizer, and $T1$ is a temperature of the stretching bath for the first polarizer.

8. The module for a liquid crystal display according to claim 1, wherein each of the first polarizer and the second polarizer comprises at least one of an optical functional film, an adhesive layer and a coating layer formed on at least one side.

9. A liquid crystal display panel comprising the module for a liquid crystal display according to claim 1.

* * * * *